Sept. 29, 1964        R. F. DAW        3,150,704

TIRE BEAD CLAMPING STRUCTURE

Filed March 29, 1962        4 Sheets-Sheet 1

Inventor
Reginald Frank Daw
by
Benj. T. Rauber
attorney

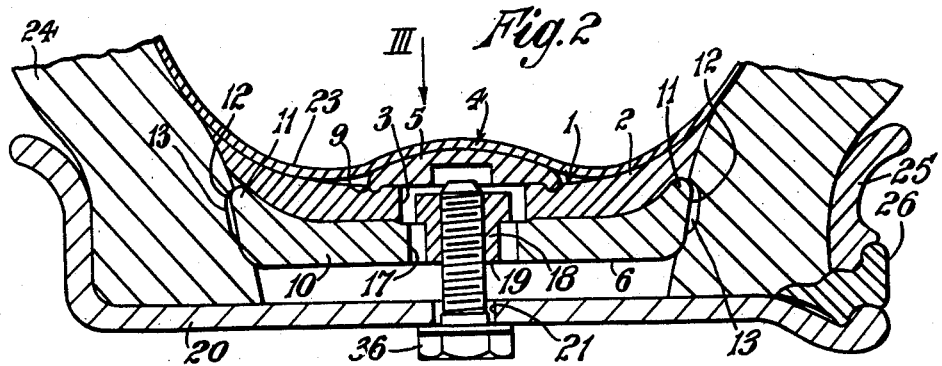
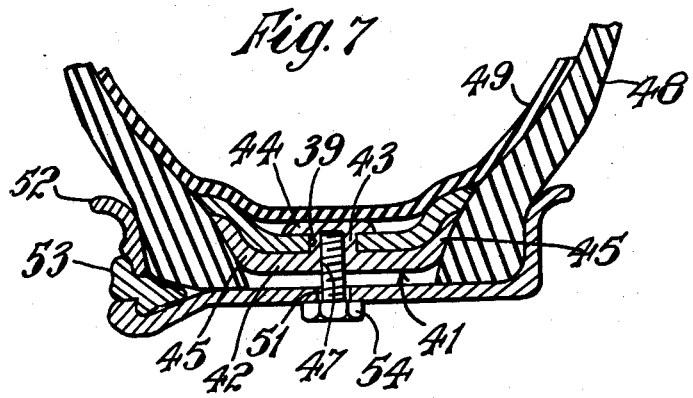

Sept. 29, 1964  R. F. DAW  3,150,704
TIRE BEAD CLAMPING STRUCTURE
Filed March 29, 1962  4 Sheets-Sheet 3

Sept. 29, 1964 R. F. DAW 3,150,704
TIRE BEAD CLAMPING STRUCTURE
Filed March 29, 1962 4 Sheets-Sheet 4
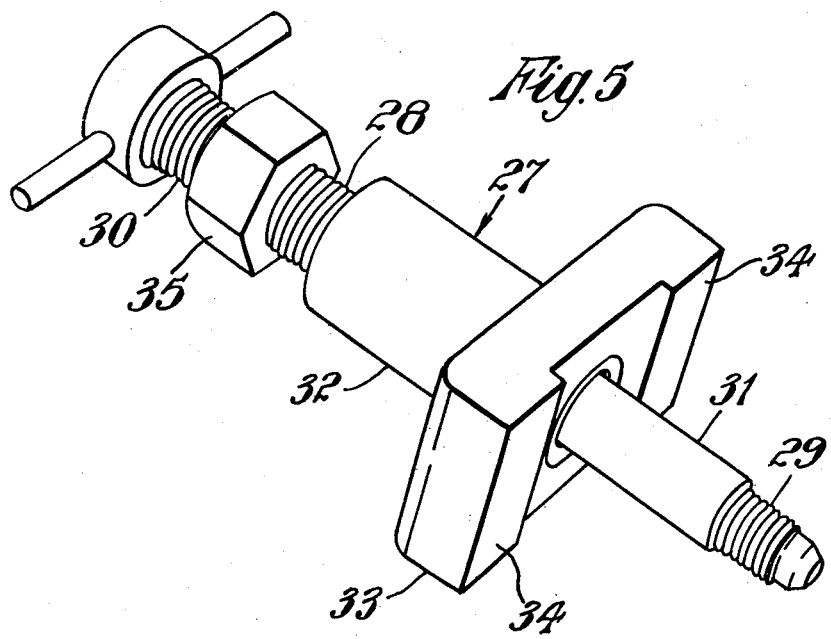
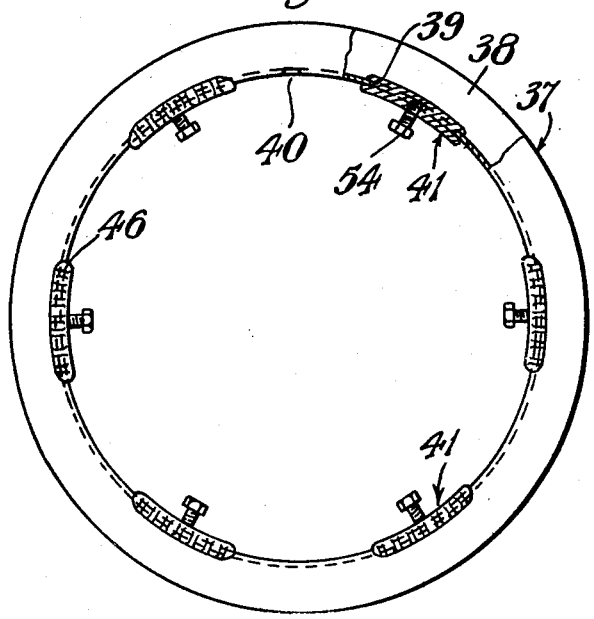
Inventor:
Reginald Frank Daw
by Benj. T. Rauber
attorney United States Patent Office 3,150,704
Patented Sept. 29, 1964

3,150,704
TIRE BEAD CLAMPING STRUCTURE
Reginald Frank Daw, Aldridge, England, assignor to Dunlop Rubber Company Limited, County of London, England, a British company
Filed Mar. 29, 1962, Ser. No. 183,507
10 Claims. (Cl. 152—400)

This invention relates to pneumatic tires.

In certain applications, notably when fitted to military vehicles or other vehicles used for cross country purposes, pneumatic tires are required on occasion to run in an uninflated or partially inflated condition. In these circumstances the tire beads tend to creep circumferentially around the wheel rim during operation. This relative movement of the tire and wheel causes damage to the inner tube, where this is provided, or the valve of the inner tube, and also damages the tire itself as a result of the heat built up by the friction between the beads and the rim. The relative movement of the tire and rim also causes tractive effort to be lost.

In the case of a tire mounted on a rim with a detachable flange secured by a split lock ring, when the tire is run in a deflated condition there is a tendency for the flange and lock ring to become detached.

According to the invention, a device for securing the beads of a pneumatic tire to a wheel rim comprises a flexible band, a plurality of wedging members for fitting within a tire mounted on a wheel rim to span the gap between the inner surface of the beads thereof, said wedging members being secured in circumferentially spaced apart positions on the flexible band, and clamping means for fixing said wedging members to the rim and for forcing said members radially inwardly with respect to the rim.

Preferably the clamping means comprises a screw-threaded means provided on each wedging member for engagement with complementary screw-threaded means provided on the rim.

Preferably also, flanges are provided on the lateral edges of the wedging members, said flanges having inclined outer surfaces which form the surfaces of a wedge. The outer surfaces may be fluted or otherwise roughened to provide an enhanced gripping effect.

It is also preferable that each wedging member comprises a wedge portion and a separate cap portion, means being provided for securing said portions together on the flexible band with the wedge portion and cap portion, respectively, on the inner peripheral surface and outer peripheral surface of the band. Each wedging member may, however, comprise a wedge portion formed integrally with a flanged key portion, the key portion extending through a slot on the flexible band so that the flange of the key portion and the wedge portion lie, respectively, in engagement with the outer peripheral surface and the inner peripheral surface of the band.

The flexible band to which the wedging members are secured is preferably in the form of a rubber flap which also serves the purpose of protecting an inner tube when a tire is run in an uninflated condition.

The invention also provides a pneumatic tire and wheel assembly comprising a device as defined above for securing the beads of a tire to the wheel rim, said wedging members being clamped to the wheel rim.

Embodiments of the invention will now be described, by way of example, with reference to the accompanying drawings in which:

FIGURE 2 is a transverse cross-sectional view of a pneumatic tire and wheel assembly incorporating the device shown in FIGURE 1;

FIGURE 5 is an isometric view of a tool for clamping and aligning the above device upon a wheel rim;

FIGURE 6 is an axial view partly in section of another device forming a second embodiment of the invention;

FIGURE 7 is a transverse cross-sectional view of a pneumatic tire and wheel assembly incorporating the device shown in FIGURE 6.

Figure 1:
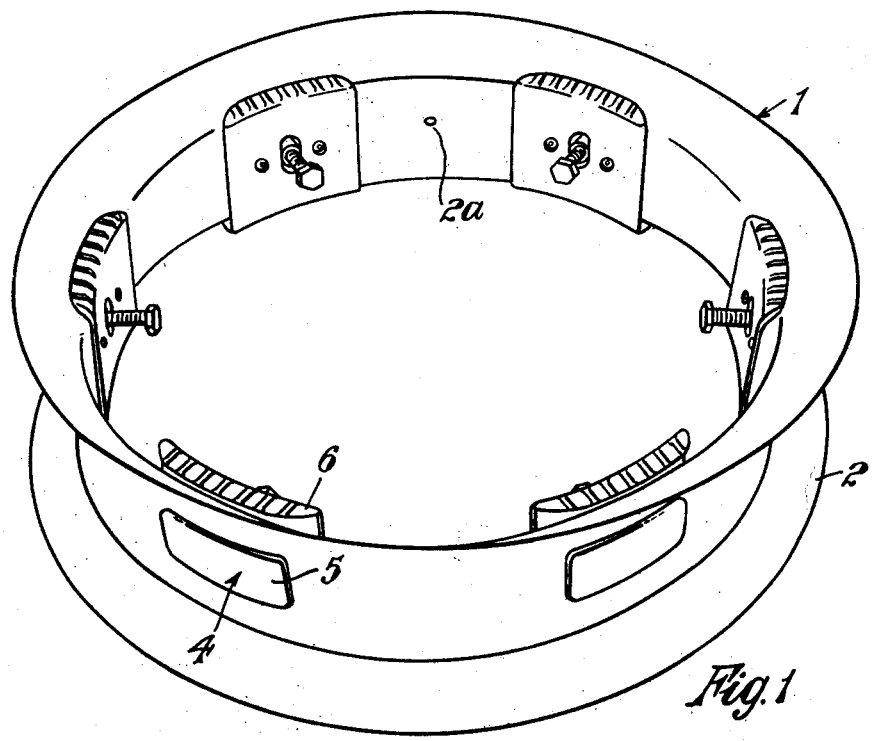
FIGURE 1 is an isometric view of a device forming one embodiment of the invention.
Figure 3:
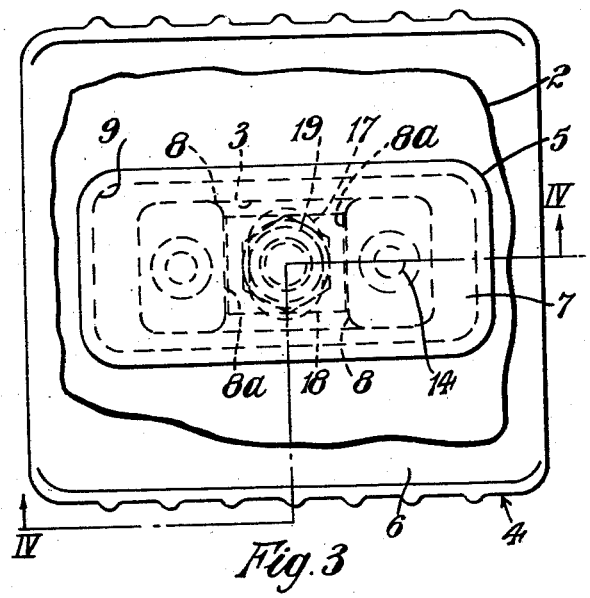
FIGURE 3 is a view in the direction of arrow III in FIGURE 2 of a part of the device shown in FIGURE 2.
Figure 4:
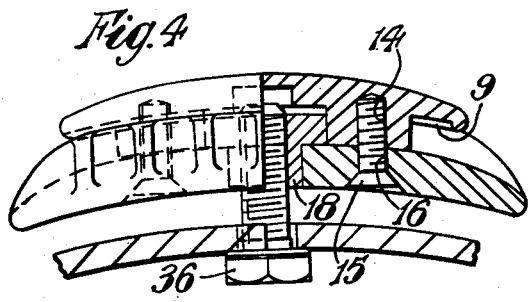
FIGURE 4 is a cross-sectional view on line IV—IV in FIGURE 3.

A device 1 (see FIGURES 1 to 4) for securing the beads of a pneumatic tire to a wheel of known type having a detachable rim flange secured by a split lock ring, is constructed as follows:

A vulcanized rubber tube-protecting flap 2 of conventional form is provided with six circumferentially-extending slots 3 (see FIGURES 2 and 3), each of the slots being disposed along the circumferential centre line of the flap and the slots being disposed in equally spaced-apart positions around the circumference of the flap. A hole 2a (see FIGURE 1) is provided in the flap midway between two of the slots 3 for the reception of the valve of an inner tube as will be described.

Six wedging members 4 made from high-tensile aluminium alloy are secured to the flap, one through each of the slots 3 as will be described. Each wedging member 4 comprises a cap portion 5 and a wedge portion 6. The cap portion consists of a rectangular plate 7 (see FIGURE 3), of greater width and length than the corresponding slot formed in the flap, a pair of spaced-apart bosses 8, each of rectangular cross-section, and a peripheral ridge 9, being integrally formed on one surface of the plate. The bosses form between them a recessed portion having parallel opposed sides 8a for a purpose to be described.

The wedge portion 6 of the wedging member consists of a plate 10 in the form of a segment of a cylinder (see FIGURE 4), the lateral edge portions of which are provided with flanges 11 (see FIGURE 2) having outer surfaces 12, for contacting the tire beads, which are inclined to one another to form the surfaces of a wedge. The inclined surfaces are provided with radially extending flutes 13 to ensure a grip on the inner surfaces of the beads.

A pair of tapped holes 14 are provided, one in each boss 8, and countersunk headed screws 15 are provided to pass through corresponding clearance holes 16 in the wedge portion to engage the tapped holes 14.

An elongated hole 17 (FIG. 3) is formed through the wedge portion, the larger transverse dimension of the hole being in a direction which is to be parallel to the axis of the wheel in the assembled state of the device.

Each wedging member 4 is secured to the flap by positioning the cap portion 5 on the outer peripheral surface of the flap with the bosses extending through the associated slot 3 in the flap, the bosses engaging the ends and the sides of the slot to prevent circumferential and lateral movement of the cap relative to the flap. A rectangular steel nut 18 having a turned-down cylindrical portion 19 is mounted upon the wedge portion with the cylindrical portion contained within the elongated hole 17. The wedge portion is positioned in engagement with the inner peripheral surface of the flap and is detachably secured to the cap portion 5 by means of the screws 15 which pass through the holes 16 and engage the tapped holes 14. In the assembled condition of each wedging member 4 upon the flap 2, the flap is compressed between the ridge 9 and the wedge portion, and the rectangular portion of the nut 18 is slidably mounted between the parallel sides 8a of the bosses 8, so that the nut is held from rotation but is slidable transversely of the wedging member. The tapped hole in the nut 18 is engageable by a bolt, the nut and the bolt forming clamping means for fixing the wedging member to the rim of a wheel as will be described.

The flap 2 is of a greater diameter than that of the base of the rim 20 of a wheel to which it is to be attached. The wheel rim has six holes 21 drilled at six points equally spaced on its circumferential centre line to correspond with the positions of the elongated holes in the wedge portions of the wedging members. Two of the holes 21 are disposed symmetrically one on each side of the valve slot provided in the rim for the passage therethrough of the valve of an inner tube.

A pneumatic tire 24, and the bead securing device are fitted to the wheel rim as follows:

An inner tube 23 is fitted into a pneumatic tire 24 and the securing device 1 is fitted within the pneumatic tire, the valve of the tube projecting through the hole 2a in the flap.

The detachable flange 25 and split lock ring 26 having been removed from the wheel rim 20, the tire, tube and flap are then slid together on to the rim, the valve of the tube being manoeuvred and adjusted to project through the valve slot in the wheel rim. The alignment of the valve with the slot in the wheel rim serves to approximately align the nuts 18 in the wedging members with the holes 21 in the rim.

The detachable flange 25 and split lock ring 26 are then re-fitted, the greater diameter of the flap than that of the rim enabling the flap and the wedging member to be pushed radially outwardly from the rim to allow the tire bead adjacent to the detachable flange to be moved axially inwardly while the flange is fitted.

The inner tube is now inflated to position the tire beads on their rim seat, and is then deflated again. A soft metal rod is then passed through each hole 21 in the wheel rim to engage the corresponding nut 18 to move it into alignment with the hole in the rim.

In order to pull the wedging members radially inwardly towards the rim, six combined clamping and aligning tools 27 are employed. These tools (see FIGURE 5) each consist of a long bolt 28 having a short screw-threaded portion 29 at one end to engage the screw-thread of the nut in the wedging member, and a second screw-threaded portion 30 at the end nearer the head of the bolt, an unthreaded portion 31 of the bolt between the two screw-threaded portions having a diameter slightly less than that of the hole 21 in the wheel rim. A cylindrical collar 32 is axially slidable on the bolt and is provided at one end with a flange 33 having a pair of spaced-apart flat seating surfaces 34, perpendicular to the axis of the collar, for engagement with the radially inner surface of the rim 20 when the bolt is passed through a hole therein. A nut 35, engaging the screw-threaded portion 30, is provided to engage the end of the collar remote from the flange.

The operation of the clamping and aligning tools 27 is as follows:

The ends of the bolts of all six tools are passed radially through the holes in the wheel rim and screwed into the nuts 18. The cylindrical collars 32 are located with their flat seating surfaces 34 against the wheel rim, and the nuts 35 are screwed down onto the collars to draw the bolts through the collars and thus to draw the wedging members radially inwardly towards the rim. During this operation the bolts are held accurately radially with respect to the wheel by the collars and draw the wedging members inwardly whilst holding them at right angles to the axes of their respective bolts, thus preventing the members from tilting, and ensuring that they contact both beads of the tire. The inner tube 23 is then inflated to hold the wedging members in position.

Each clamping and aligning tool is then removed and clamping means in the form of a short bolt 36 (see FIG. 2), is immediately screwed into the nut 18 contained in each wedging member and tightened to clamp the wedging member against the tire beads, thus securing the beads to the wheel rim as shown in FIGURE 2.

When it is desired to remove the tire from the rim, the inner tube is deflated and the clamping bolts 36 are removed. The clamping and aligning tools are then screwed into the nuts 18 of the wedging members and their bolts 28 are pushed, or struck by a hammer to free the wedging members from engagement with the tire beads. The flap 2 and wedging members 4 are thus moved radially outwardly to enable the tire bead adjacent to the detachable flange 25 to be moved axially inwardly so that the split lock ring 26 and detachable flange may be removed.

The slidable mounting of the nuts 18 within the wedging members enables the members to centralise themselves between the tire beads as they are drawn radially inwardly by the clamping and aligning tools, and thus to apply pressure to the two beads of the tire to clamp the beads to the wheel rim. This enables tires having slightly different bead widths to be secured to a given rim and ensures that the wedging members can freely grip both beads. The clamping and aligning tools 27 provide an efficient means for driving the wedging members accurately in a radial direction.

In a second embodiment of the invention shown in FIGURES 6 and 7, a device 37 according to the invention comprises a tube-protecting flap 38 which is provided with six slots 39 of similar shape to the slots 3 described in the first embodiment, the slots 39 being equally-spaced circumferentially around the flap on the centre line of the flap. A hole 40 for the passage of an inner tube valve through the flap is disposed midway between two of the slots 39.

Six wedging members 41 are secured to the flaps, one member through each of the holes 39. Each wedging member comprises a wedge portion 42 integrally formed with a key portion 43 which extends from one side thereof, the key portion having a flange 44 formed on its end remote from the wedge portion. Each flange 44, of rectangular shape in plan view, is slightly larger in width and in length than its associated slot, but the key portion disposed between the flange and the wedge portion is of width and length to engage the slot around substantially the whole of its periphery to prevent transverse and circumferential movement of the wedging member when assembled on the flap. The wedge portion 42 is of similar shape to the wedge portion 6 of the first embodiment, comprising two side flanges 45 which are inclined to one another and are provided with flutes 46.

A tapped hole 47 is provided in the central region of each wedging member, the hole providing means for engagement with a bolt, the tapped hole and the bolt forming clamping means for fixing the member to the rim of a wheel as will be described.

Each wedging member is secured to the flap by forcing the flange 44 through its respective slot 39 by stretching and distorting the surrounding rubber. When correctly positioned upon the flap, the wedge portion is disposed on the inner peripheral surface of the flap, and the flange, which serves to retain the member in position, is disposed on the outer peripheral surface of the flap.

The device 37 is mounted together with a tire 48 and inner tube 49 upon the rim 50 of a wheel in a manner similar to that described for the assembly of the device in the first embodiment, the rim being provided with six clearance holes 51 to provide alignment with the tapped holes 47. After the detachable flange 52 and split right 53 of the rim have been positioned upon the rim each wedging member is moved radially inwardly of the wheel in the manner described in the first embodiment by the use of six clamping and aligning tools 27. The inner tube is then inflated, the tools 27 removed, and six bolts 54, which form clamping means for the wedging members, are passed, one through each of the holes 51, and screwed into the tapped holes 47 to clamp the wedging members against the tire beads thus securing the beads to the wheel rim, as shown in FIGURE 7.

To remove the tire from the rim, the bolts 54 are removed and the tire is removed with the use of the clamping and aligning tool 27 in the manner described in the first embodiment.

The bead-securing devices of the embodiments described above have the advantages that the wedging members are held by the flap in predetermined positions corresponding to the holes in the wheel rim, thus facilitating assembly.

Having now described my invention, what I claim is:

1. A device for securing the beads of a pneumatic tire to a wheel rim which comprises an annular flap of flexible elastomeric material of a width to span the space between the beads and extend to lie against the inner surface of the tire, wedging members spaced circumferentially about the inner surface of said flap, each said member comprising a plate of arcuate shape and of less width than the width of said flap, means for securing each said plate to said flap with the flap extending beyond the side edges of said plates to lie against the inner surface of said tire, the side edges of said plates flaring radially and axially outwardly to engage the beads of a tire with a wedging action when said members are drawn radially inwardly, and means engaging said wedging members to draw said wedging members radially inwardly.

2. The device of claim 1 in which said wedging members have radially extending threaded holes and said means to draw said wedging members radially inwardly comprises screws threaded into said holes from a radially inwardly direction.

3. The device of claim 2 in which each of said plates is arcuate and has a central zone and side flanges extending at an obtuse angle to said central zone to provide wedging surfaces against the bead portions of a tire and to define an open valley receiving said flap with the flap extending sideways beyond said flanges to lie against the inner surface of a tire.

4. The device of claim 2 in which said flap has openings, one for each wedging member and each of said wedging members has a securing element extending through one of said holes in said flap and overlying the margin of said flap about said hole to secure said wedging element to said plate and in which said threaded hole of each wedging member extends into said securing element.

5. The device of claim 2 in which said securing element comprises a cap secured to said plate and having a rectangular recess and a hollow, internally threaded, bolt to receive said screw and having a rectangular head slidable in said recess transversely of the circumference of said flap and said plate has a hole through which said bolt passes and of a diameter to allow said bolt to slide therein transversely of the circumference of said flap.

6. The device of claim 4 in which said securing element is a hollow, threaded, key portion extending through an opening in said flap and having a flange overlying a margin of said flap about said opening, said screw being threaded into said key portion.

7. A device for securing the beads of a pneumatic tire to a wheel rim comprising a flexible band, a plurality of wedging members for fitting within a tire mounted on a wheel rim to span the gap between the inner surfaces of the beads thereof, said wedging members being secured in circumferentially spaced-apart positions on the flexible band, and clamping means for fixing said members to the rim and for forcing said members radially inwardly with respect to the rim, said clamping means gagement with said wedging means and complementary screw-threaded means for attachment to the rim and for engagement with the screw threaded means in axially slidable engagement with said wedging means and wherein each wedging member defines an axially elongated recomprising screw threaded means in axially slidable encessed portion having parallel opposed sides transverse to the circumferential median line of said band, and the screw-threaded means engaged with the wedging member has two parallel sides, the means being slidably but non-rotatably mounted within the recess for movement laterally of the device with the parallel sides of the screw-threaded means in slidable engagement with the parallel sides of the recessed portion.

8. A device according to claim 7 wherein the screw-threaded means provided in each wedging member is a screw threaded nut.

9. A device for securing the beads of a pneumatic tire to a wheel rim comprising a flexible band, a plurality of wedging members for fitting within a tire mounted on a wheel rim to span the gap between the inner surfaces of the beads thereof, said wedging members being secured in circumferentially spaced-apart positions on the flexible band, and clamping means for fixing said wedging members to the rim and for forcing said members radially inwardly with respect to the rim, said clamping means comprising screw-threaded means in axially slidable engagement with said wedging means and a complementary screw-threaded means for attachment to the rim and for engagement with the screw-threaded means in axially slidable engagement with said wedging members and wherein each wedging member comprises a wedge portion and a separate cap portion, means securing said portions together and to the flexible band with the wedge portion on the inner peripheral surface and the cap portion on the outer peripheral surface of the flexible band and wherein the flexible band is provided with a plurality of slots, one for each wedging member, and the means for securing the wedge portion and the cap portion of each wedging member together, and to the band comprises a pair of bosses formed integrally on one of the portions, said bosses extending into one of the slots and being secured to the other portion by screw-threaded means.

10. A device for securing the beads of a pneumatic tire to a wheel rim comprising a flexible band, a plurality of wedging members for fitting with a tire mounted on a wheel rim to span the gap between the inner surfaces of the beads thereof, said wedging members being secured in circumferentially spaced-apart positions on the flexible band, and clamping means for fixing said wedging members to the rim and for forcing said members radially inwardly with respect to the rim, said clamping means comprising screw-threaded means in axially slidable engagement with the wedging means and complementary screw-threaded means for attachment to the rim and for engagement with the screw-threaded means in axially slidable engagement with said wedging means and wherein each wedging member comprises a wedge portion and a separate cap portion, means securing said portions together and to the flexible band with the wedge portion on the inner peripheral surface and the cap portion on the outer peripheral surface of the flexible band and wherein each wedging member comprises a wedge portion formed integrally with a flanged key portion, and said flexible band is provided with a plurality of slots, one for each wedging member, the key portion of each wedging member extending through one of the slots with the flange of the key portion lying in engagement with the outer peripheral surface of the band and the wedge portion lying in engagement with the inner peripheral surface of the band.

References Cited in the file of this patent

UNITED STATES PATENTS

| | | |
|---|---|---|
| 1,163,695 | Schweinert et al. | Dec. 14, 1915 |
| 2,367,820 | Brink | Jan. 23, 1945 |
| 2,393,494 | Hale | Jan. 22, 1946 |